United States Patent
Iguchi et al.

(10) Patent No.: US 12,533,113 B2
(45) Date of Patent: Jan. 27, 2026

(54) PROGRAM, INFORMATION PROCESSING METHOD, INFORMATION PROCESSING DEVICE, AND MODEL GENERATING METHOD

(71) Applicant: TERUMO KABUSHIKI KAISHA, Tokyo (JP)

(72) Inventors: Akira Iguchi, Mishima (JP); Yusuke Seki, Tokyo (JP); Yuki Sakaguchi, Isehara (JP)

(73) Assignee: TERUMO KABUSHIKI KAISHA, Tokyo (JP)

( * ) Notice: Subject to any disclaimer, the term of this patent is extended or adjusted under 35 U.S.C. 154(b) by 509 days.

(21) Appl. No.: 17/953,563

(22) Filed: Sep. 27, 2022

(65) Prior Publication Data

US 2023/0020491 A1    Jan. 19, 2023

Related U.S. Application Data

(63) Continuation of application No. PCT/JP2021/009299, filed on Mar. 9, 2021.

(30) Foreign Application Priority Data

Mar. 27, 2020    (JP) ................ 2020-058995

(51) Int. Cl.
*A61B 8/00*    (2006.01)
*A61B 8/08*    (2006.01)
(Continued)

(52) U.S. Cl.
CPC .......... *A61B 8/5238* (2013.01); *A61B 8/0891* (2013.01); *G06T 7/0012* (2013.01);
(Continued)

(58) Field of Classification Search
CPC ... A61B 8/5238; A61B 8/0891; A61B 8/5215; A61B 8/12; G06T 7/0012;
(Continued)

(56) References Cited

U.S. PATENT DOCUMENTS 11,308,609 B2 *    4/2022    Annangi .................. A61B 8/54
12,059,302 B2 *    8/2024    Ota ....................... A61B 8/5207
(Continued)

FOREIGN PATENT DOCUMENTS

JP    2012196302 A    10/2012
JP    2013517039 A *    5/2013 ........... A61B 5/0084
(Continued)

OTHER PUBLICATIONS

International Search Report (PCT/ISA/210) with translation and Written Opinion (PCT/ISA/237) mailed on May 11, 2021, by the Japan Patent Office as the International Searching Authority for International Application No. PCT/JP2021/009299.

*Primary Examiner* — Stephen R Koziol
*Assistant Examiner* — Joshua Chen
(74) *Attorney, Agent, or Firm* — Buchanan Ingersoll & Rooney PC

(57) ABSTRACT

A non-transitory computer-readable medium (CRM) storing computer program code executed by a computer processor that executes a process, an information processing apparatus, and model generation method that generates an image of a lumen organ. The process includes acquiring a first image obtained by imaging a lumen organ of a patient based on an ultrasound signal of a first frequency; and generating a second image by inputting the acquired first image into a model, the model being learned to generate, when the first image is input, the second image in which the lumen organ is imaged based on an ultrasound signal of a second frequency. Preferably, the second image, in which a part of an
(Continued)

image region of the first image is converted into the second frequency, is generated using the model, and a synthesis image is generated in which the second image is superimposed to the first image.

20 Claims, 8 Drawing Sheets

(51) Int. Cl.
*G06T 7/00* (2017.01)
*G06T 11/00* (2006.01)

(52) U.S. Cl.
CPC .............. *G06T 2207/10072* (2013.01); *G06T 2207/10132* (2013.01); *G06T 2207/30101* (2013.01)

(58) Field of Classification Search
CPC . G06T 2207/10072; G06T 2207/10132; G06T 2207/30101; G06T 11/00; G01S 7/52047
See application file for complete search history.

(56) References Cited

U.S. PATENT DOCUMENTS

| | | |
|---|---|---|
| 2014/0350404 A1 | 11/2014 | Rajguru et al. |
| 2017/0095292 A1 | 4/2017 | Taylor et al. |
| 2019/0374165 A1 | 12/2019 | Poole et al. |
| 2020/0060652 A1 | 2/2020 | Dahl et al. |
| 2021/0110582 A1* | 4/2021 | Sornes ................ G06T 5/60 |
| 2021/0228188 A1* | 7/2021 | Sasaki ................ A61B 8/4444 |
| 2021/0287361 A1* | 9/2021 | Shriram ................ G06T 7/73 |

FOREIGN PATENT DOCUMENTS

| | | | | |
|---|---|---|---|---|
| JP | 2015503363 A | 2/2015 | | |
| JP | 2018534970 A | 11/2018 | | |
| JP | 2019209130 A | 12/2019 | | |
| KR | 20100049336 A | * | 5/2010 | ............ A61B 8/52 |

\* cited by examiner

40 MHz IMAGE

60 MHz IMAGE

PROGRAM, INFORMATION PROCESSING METHOD, INFORMATION PROCESSING DEVICE, AND MODEL GENERATING METHOD

CROSS-REFERENCES TO RELATED APPLICATIONS

This application is a continuation of International Application No. PCT/JP2021/009299 filed on Mar. 9, 2021, which claims priority to Japanese Application No. 2020-058995 filed on Mar. 27, 2020, the entire content of both of which is incorporated herein by reference.

TECHNOLOGICAL FIELD

The present disclosure generally relates to a program, an information processing method, an information processing device, and a model generating method.

BACKGROUND DISCUSSION

There is an image diagnostic technique for generating an ultrasound image of the inside of a human body using ultrasound. For example, Japanese Patent Application Publication No. 2019-209130A discloses an ultrasound diagnostic apparatus that acquires an ultrasound image according to application values of parameters such as a frequency and a frame rate of ultrasound, the ultrasound diagnostic apparatus extracting a feature of a region of interest of the acquired ultrasound image, inputting the feature to a machine learning model, predicting an optimum value of a parameter for optimizing image information in the region of interest, and setting the predicted optimum value as the application value.

However, in Japanese Patent Application Publication No. 2019-209130A, an optimum parameter to be applied to an ultrasound inspection can be predicted, but it is not possible to convert the acquired ultrasound image into an image of a desired frequency.

SUMMARY

A non-transitory computer-readable medium, an information processing method, an information processing apparatus, and a model generation method, are disclosed that are capable of suitably supporting ultrasound image diagnosis.

In one aspect, a non-transitory computer-readable medium (CRM) storing computer program code executed by a computer processor that executes a process comprising: acquiring a first image obtained by imaging a lumen organ of a patient based on an ultrasound signal of a first frequency; and generating a second image by inputting the acquired first image into the second image with a model, the model being learned to generate, when the first image is input, the second image in which the lumen organ is imaged based on an ultrasound signal of a second frequency.

In another aspect, an information processing device is disclosed comprising: an acquisition unit configured to acquire a first image obtained by imaging a lumen organ of a patient based on an ultrasound signal of a first frequency; and a generation unit configured to generate a second image by inputting the acquired first image into a model, the model being learned to generate, when the first image is input, the second image in which the lumen organ is imaged based on an ultrasound signal of a second frequency.

In a further aspect, a model generating method executed by a computer is disclosed, the model generating method comprising: acquiring training data including a first image and a second image obtained by imaging a lumen organ of a patient based on ultrasound signals of a first frequency and a second frequency, respectively; and generating, based on the training data, a model that is learned to generate the second image when the first image is input.

In one aspect, it is possible to suitably support ultrasound image diagnosis.

DETAILED DESCRIPTION

Set forth below with reference to the accompanying drawings is a detailed description of embodiments of a program, an information processing method, an information processing device, and a model generating method. Note that since embodiments described below are preferred specific examples of the present disclosure, although various technically preferable limitations are given, the scope of the present disclosure is not limited to the embodiments unless otherwise specified in the following descriptions.

First Embodiment

Figure 1:
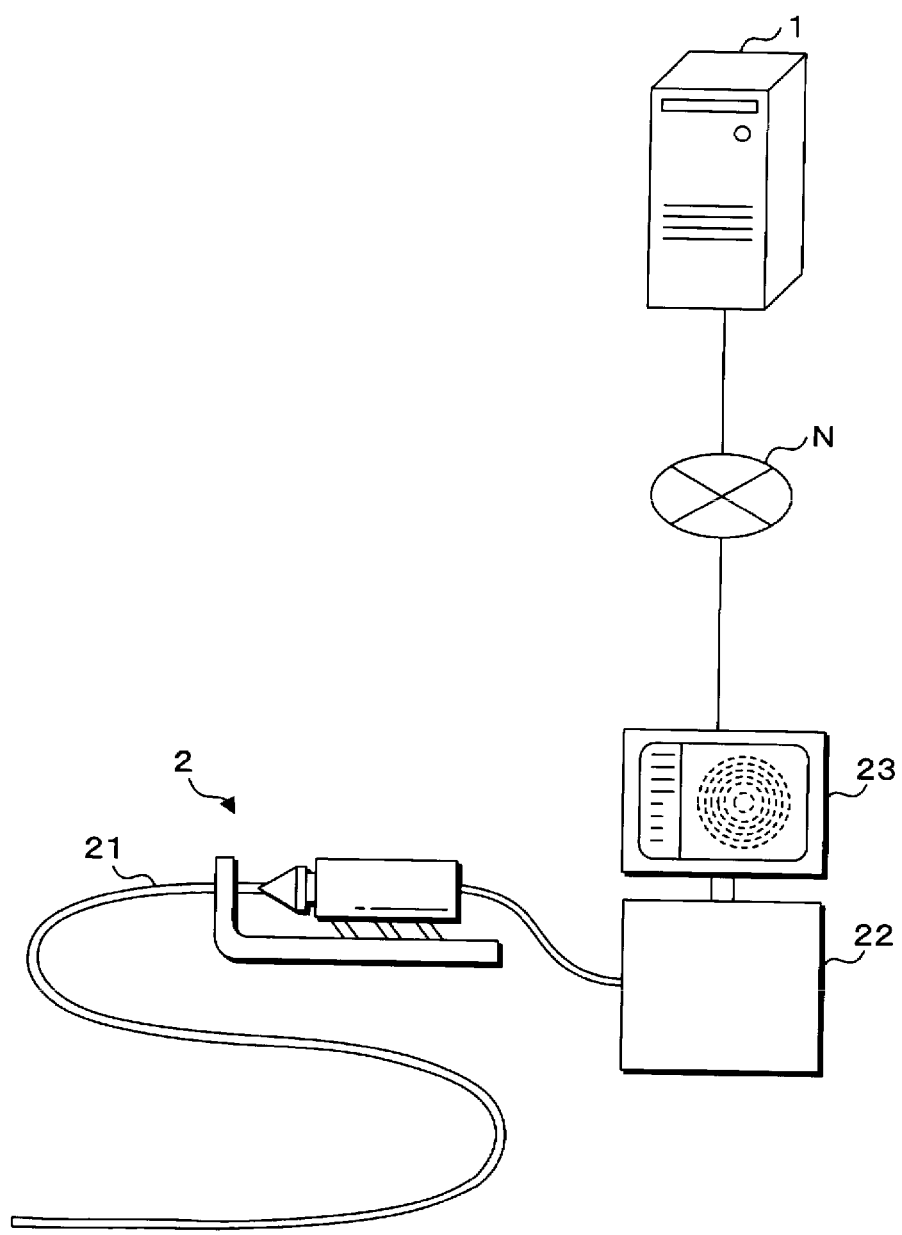
FIG. 1 is an explanatory diagram showing a configuration example of an image diagnosis system.

FIG. 1 is an explanatory diagram showing a configuration example of an image diagnosis system. In the present embodiment, an image diagnosis system that generates an ultrasound tomographic image (hereinafter, referred to as a "second image") imaged with an ultrasound signal of a second frequency based on an ultrasound tomographic image (hereinafter, referred to as a "first image") obtained by imaging a lumen organ of a patient based on an ultrasound signal of a first frequency will be described. The image diagnosis system can include an information processing device 1 and a diagnostic imaging apparatus 2. The information processing device 1 and the diagnostic imaging apparatus 2 are communicably connected to each other via a network N such as a local area network (LAN) or the Internet.

The diagnostic imaging apparatus 2 can be an apparatus unit that images a lumen organ of a patient, and can be, for example, an intravascular ultrasound (IVUS) apparatus that performs an ultrasound inspection in a blood vessel of the patient using a catheter 21. The diagnostic imaging apparatus 2 can include the catheter 21, an image processing device 22, and a display device 23. The catheter 21 is a medical instrument to be inserted into a blood vessel of a subject, and includes an imaging core that transmits ultrasound based on a pulse signal and receives a reflected wave from an inside of the blood vessel. The diagnostic imaging apparatus 2 generates an ultrasound tomographic image of the inside of the blood vessel based on a signal of the reflected wave received by the catheter 21. The image processing device 22 is a processing device that processes data of the reflected wave received by the catheter 21 to generate a tomographic image, and includes an input interface or the like for displaying the generated tomographic image on the display device 23 and receiving inputs of various setting values when the inspection is performed.

In the present embodiment, an intravascular inspection will be described as an example, but the lumen organ to be inspected is not limited to a blood vessel, and may be, for example, another lumen organ such as a bile duct, a pancreatic duct, a bronchus, or an intestine. In addition, an image to be processed is not limited to an image referred to as the tomographic image, and may be an ultrasound image imaged using the ultrasound.

The information processing device 1 is an information processing device capable of executing various types of information processes and transmission and reception of information, and can be, for example, a server computer, or a personal computer. In the present embodiment, the information processing device 1 can be the server computer, and hereinafter, the information processing device 1 is read as the server 1 for the sake of simplicity. The server 1 may be a local server provided in the same facility (hospital or the like) as the diagnostic imaging apparatus 2, or may be a cloud server communicably connected to the diagnostic imaging apparatus 2 via the Internet or the like. The server 1 can function as a generation device that generates the second image based on the first image generated by the diagnostic imaging apparatus 2, and outputs the generated second image to the diagnostic imaging apparatus 2. Specifically, as will be described later, the server 1 executes in advance machine learning of learning predetermined training data, and prepares a generation model 50 (see, for example, FIG. 3) for generating the second images of different frequencies using the first image as an input. The server 1 inputs the first image acquired from the diagnostic imaging apparatus 2 to the generation model 50, outputs the generated second image to the diagnostic imaging apparatus 2, to cause the diagnostic imaging apparatus 2 to display the generated second image.

In the present embodiment, the second image is generated in the server 1 separate from the diagnostic imaging apparatus 2, but the second image can be generated in the diagnostic imaging apparatus 2 by installing the generation model 50 generated by the server 1 executing the machine learning in the diagnostic imaging apparatus 2 (image processing device 22).

Figure 2:
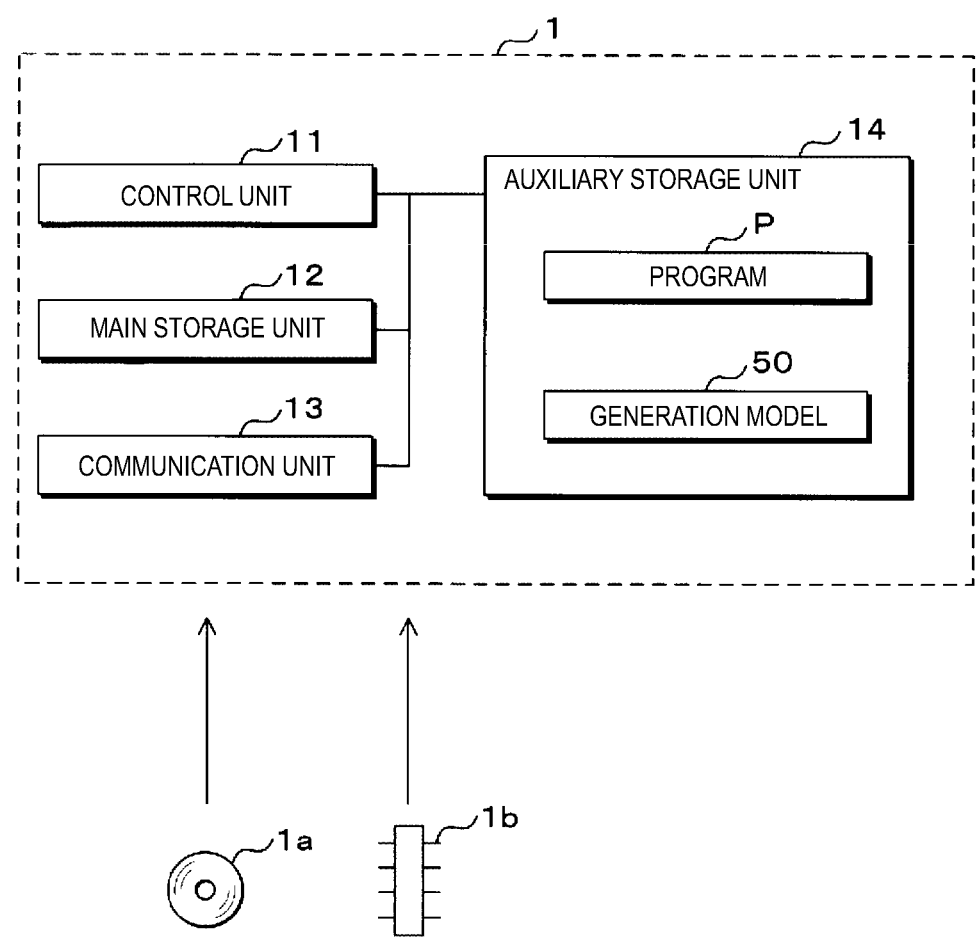
FIG. 2 is a block diagram showing a configuration example of a server.

FIG. 2 is a block diagram showing a configuration example of the server 1. The server 1 can include a control unit 11, a main storage unit 12, a communication unit 13, and an auxiliary storage unit 14.

The control unit 11 can include one or more arithmetic processing devices such as a central processing unit (CPU), a micro-processing unit (MPU), and a graphics processing unit (GPU), and executes various types of information processes, a control process, and the like by reading a program P stored in the auxiliary storage unit 14 and executing the program P. The main storage unit 12 can be a temporary storage area such as a static random access memory (SRAM), a dynamic random access memory (DRAM), or a flash memory, and temporarily stores data necessary for the control unit 11 to execute an arithmetic process. The communication unit 13 can be a communication module that executes a process related to communication, and transmits and receives information to and from the outside.

The auxiliary storage unit 14 can be a nonvolatile storage area such as a large-capacity memory or a hard disk, and stores the program P necessary for the control unit 11 to execute the process and data other than the program P. In addition, the auxiliary storage unit 14 stores the generation model 50. The generation model 50 can be a machine learning model in which the training data is learned as described above, and can be a model that generates the second image obtained by converting the first image using the first image as the input. The generation model 50 can be used as a program module constituting artificial intelligence software.

The auxiliary storage unit 14 may be an external storage device connected to the server 1. The server 1 may be a multi-computer including a plurality of computers, or may be a virtual machine virtually constructed by software.

In the present embodiment, the server 1 is not limited to the configuration described above, and may include, for example, an input unit that receives an operation input, and a display unit that displays an image. In addition, the server 1 may include a reading unit that reads a portable storage medium 1a such as a compact disc (CD), a digital versatile disc (DVD), or a universal serial bus (USB) memory, and may read the program P from the portable storage medium 1a and execute the program P. Alternatively, the server 1 may read the program P from a semiconductor memory 1b.

Figure 3:
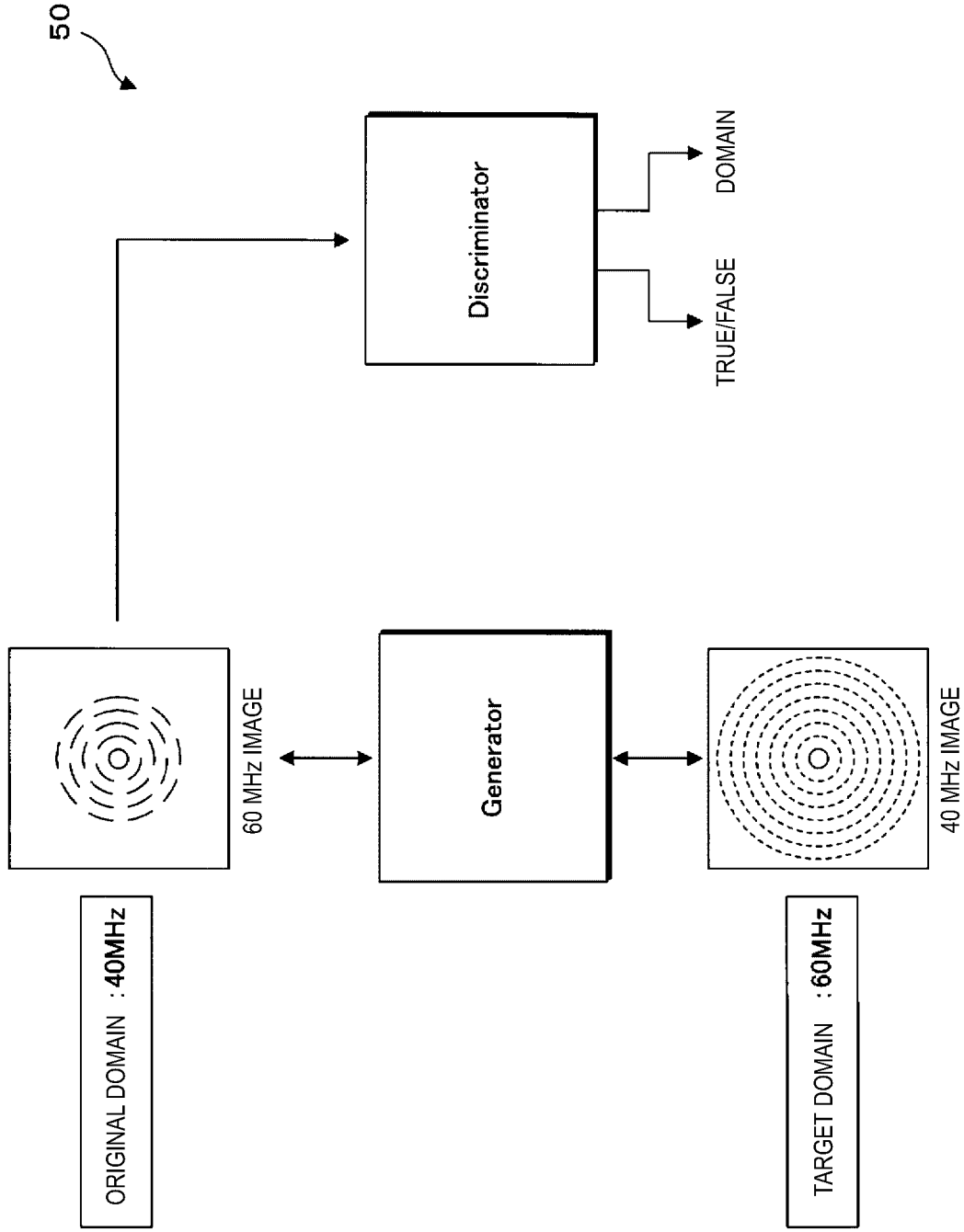
FIG. 3 is an explanatory diagram related to a generation model.

FIG. 3 is an explanatory diagram related to the generation model 50. An outline of the generation model 50 will be described with reference to FIG. 3.

The generation model 50 can be a machine learning model that receives the first image imaged by the diagnostic imaging apparatus 2 as the input and generates the second image obtained by converting a frequency of the first image. In the present embodiment, a generative adversarial network (GAN) can be used as the generation model 50. The GAN includes a generator that generates output data from input data and a discriminator that distinguishes authenticity of the data generated by the generator, and constructs a network by causing the generator and the discriminator to compete with each other and execute learning.

The generator related to the GAN receives an input of random noise (latent variable) and generates the output data. The discriminator learns the authenticity of the data provided from the generator using true data provided for learning and the data provided from the generator. In the GAN, the network is constructed, so that a loss function of the generator is finally minimized and a loss function of the discriminator is maximized.

In the present embodiment, the server 1 generates the GAN for generating the second image from the first image as the generation model 50 using the first image and the second image for training. For example, first, the server 1 can input a first medical image for training to the generator while fixing parameters (weight, and the like) of the generator, and generates a second medical image. Then, the server 1 provides the second medical image generated by the generator as false data and the second medical image for training as the true data to the discriminator, and optimizes parameters of the discriminator. Next, the server 1 fixes the parameters of the discriminator to optimum values, and executes learning of the generator. When the second medical image generated by the generator is input to the discriminator, the server 1 optimizes the parameters of the generator such that a probability of the authenticity, for example, approximates 50%. Accordingly, the server 1 generates the generation model 50. When the second medical image is actually generated based on the first medical image, only the generator is used.

The generation model 50 is not limited to the GAN, and may be a variational autoencoder (VAE), a neural network such as a U-net, or a model based on another learning algorithm.

In the present embodiment, the server 1 can generate a StarGAN as the generation model 50 for frequency conversion. The StarGAN is a model that executes mutual conversion of data between a plurality of domains. A generator of the StarGAN receives, as inputs, data of one domain and a label indicating another domain as a target, and generates data of the other domain. A discriminator distinguishes authenticity of the data generated by the generator and a domain of the corresponding data. In the StarGAN, learning is executed using a loss function (adversarial loss) for evaluating the authenticity of the data generated by the generator, a loss function (domain class loss) related to classification of the domains, and a loss function (reconstruction loss) for guaranteeing inverse conversion of the generated data to an original domain, and parameters of the generator and the discriminator are optimized.

The server 1 can generate the generation model 50 using at least three or more ultrasound frequencies as the domains of the StarGAN. For example, the server 1 can set, for example, 40 MHz, 45 MHz, 50 MHz, 55 MHz, and 60 MHz as ultrasound frequencies corresponding to the domains, and generates the generation model 50 that converts an ultrasound tomographic image of any frequency into an ultrasound tomographic image of another frequency. The server 1 executes learning using training data including ultrasound tomographic images of frequencies, and generates the generation model 50 that receives, as inputs, an ultrasound tomographic image corresponding to one frequency and a class label indicating another frequency as a target and that generates an ultrasound tomographic image corresponding to the other frequency.

In the above description, the StarGAN is given as an example of the generation model 50, but a GAN having another network structure, such as a CycleGAN, may be used. In addition, a configuration is not essential in which the generation model 50 is a model capable of executing mutual conversion between a plurality of frequencies, and the generation model 50 may be a model capable of converting a single frequency alone.

The server 1 converts the first image into the second image using the generation model 50 described above. For example, the server 1 converts a first image of a low frequency (i.e., a lower frequency) into a second image of a high frequency (i.e., a higher frequency, the high frequency being higher than the low frequency) in order to increase a resolution of an ultrasound tomographic image. In general, by setting the ultrasound transmitted from the catheter 21 to the high frequency, the resolution of the ultrasound tomographic image is increased, and an intima-lumen boundary of the blood vessel becomes clear and interpretation is facilitated. Therefore, the server 1 inputs the first image of the low frequency to the generation model 50 and generates the second image of the high frequency, thereby increasing the resolution of the ultrasound tomographic image.

On the other hand, when the ultrasound signal is set to the high frequency, the signal is likely to be attenuated during transmission through a medium. In this case, there is also a drawback that the longer a distance from the catheter 21, the more difficult it is to receive the reflected wave, and thus, information on the blood vessel in a depth direction of the blood vessel can be relatively scarce. Therefore, as described below, the server 1 generates a synthesis image obtained by combining the first image of the low frequency and the second image of the high frequency, and presents the synthesis image to a user.

In the present embodiment, the second image of the high frequency is generated from the first image of the low frequency in order to increase the resolution, but a second image of a low frequency may be generated based on a first image of a high frequency. As described above, a configuration is not essential in which the first frequency is lower than the second frequency, and it is sufficient that an image of the second frequency different from the first frequency can be generated.

Figure 4:
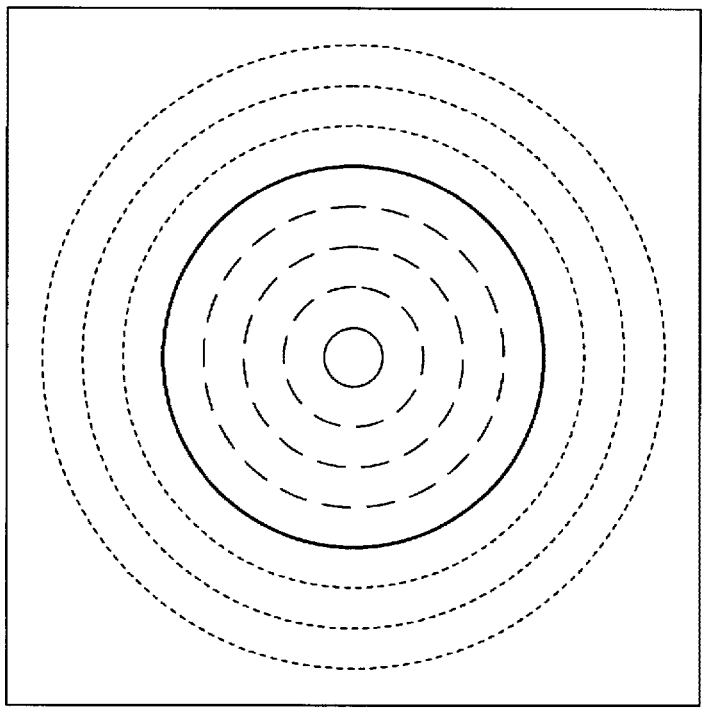
FIG. 4 is an explanatory diagram related to a synthesis image.
Figure 4:
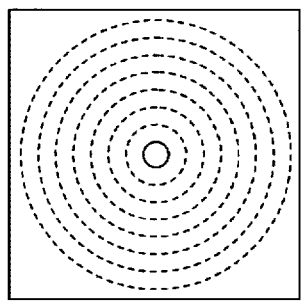
Figure 4:
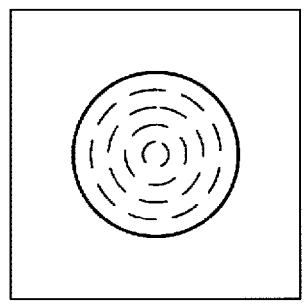

FIG. 4 is an explanatory diagram related to a synthesis image. FIG. 4 conceptually shows a state of generating a synthesis image in which a region within a predetermined distance from an image center point is set as the second image and the other region is set as the original first image. In FIG. 4, for the sake of convenience, a boundary between an image region corresponding to the second image and the other region is indicated by a relatively thick line. The synthesis image will be described with reference to FIG. 4.

The server 1 can superimpose a part of an image region of the second image generated by the generation model 50 on the first image to generate a synthesis image. Specifically, the server 1 extracts an image region within a predetermined distance from an image center point corresponding to an intima-lumen region of the blood vessel from the second image, and superimposes the image region on the first image. In this manner, the server 1 generates an ultrasound tomographic image in which the intima-lumen region has a high resolution (i.e., a higher resolution) and the other region has a low resolution (i.e., a lower resolution), and presents the ultrasound tomographic image to the user.

In this case, it is preferable that the server 1 changes the image region extracted from the second image by determining the distance from the center point according to a level of the second frequency. Specifically, the server 1 can set the distance from the center point to be shorter as the second frequency is higher, and extracts the image region within the corresponding distance. Accordingly, in light of a characteristic that attenuation is more likely to occur as the frequency increases, an appropriate range can be replaced with the second image having a high resolution.

Although it has been described above that a part of the image region is extracted (cut out) from the second image generated by the generation model 50, the present embodiment is not limited to the part of the image region that is extracted (cut out) from the second image generated by the generation model 50. For example, the server 1 may cause the generation model 50 to execute learning so as to generate an image of only a region within the predetermined distance from the center point, and generate a second image of only the corresponding region. In this case, the server 1 provides an image corresponding to only a part of an image region of the first image to the generation model 50 as the second image for training, and causes the generation model 50 to execute the learning. Accordingly, the generation model 50 can generate the second image of only the desired image region.

Alternatively, the server 1 may cause the generation model 50 to execute the learning such that a synthesis image obtained by converting a part of the image region of the first image into the second frequency using the first image as the input is directly generated as the second image. In this case, the server 1 provides a synthesis image obtained by superimposing an image of the second frequency on a part of the first image to the generation model 50 as the second image for training, and causes the generation model 50 to execute the learning. Accordingly, the generation model 50 can directly generate the synthesis image.

As described above, the server 1 only needs to be capable of generating the second image obtained by converting at least a part of the image region of the first image into the second frequency, and the configuration of generating the second image in the entire range is not essential.

Figure 5:
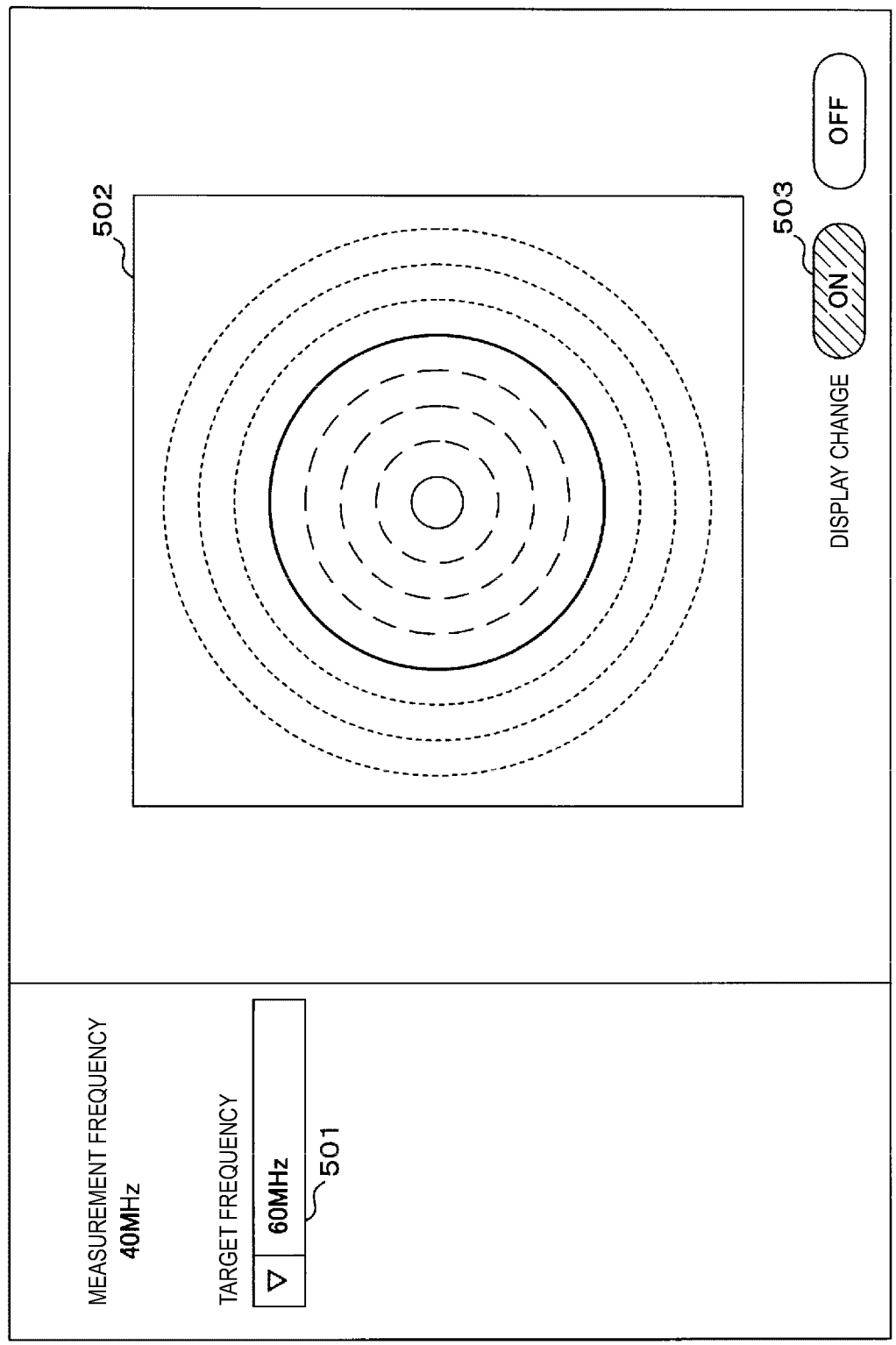
FIG. 5 is an explanatory diagram showing an example of a display screen in a diagnostic imaging apparatus.

FIG. 5 is an explanatory diagram showing an example of a display screen in the diagnostic imaging apparatus 2. FIG. 5 shows an example of a screen displayed by the diagnostic imaging apparatus 2 during an ultrasound inspection. For example, the server 1 sequentially acquires the first images from the diagnostic imaging apparatus 2 during the inspection, sequentially generates a synthesis image in real time, and displays the synthesis image on the screen as shown in FIG. 5.

In the present embodiment, image generation can be performed in real time during the inspection, but it is needless to say that the recorded ultrasound tomographic image (first image) may be input to the generation model 50 afterward to generate the second image.

For example, the diagnostic imaging apparatus 2 displays a first frequency (described as "measurement frequency" in FIG. 5) on a menu bar on a left side of the screen, and displays a frequency setting field 501 for setting the second frequency (described as "target frequency" in FIG. 5). The frequency setting field 501 is an input field for receiving a setting input of the second frequency. The diagnostic imaging apparatus 2 receives a setting change of changing the first frequency to the second frequency via the frequency setting field 501.

When the setting change of the frequency is received, the server 1 sequentially inputs the first images sequentially acquired from the diagnostic imaging apparatus 2 to the generation model 50, and starts the generation of the second image (i.e., single second image). The server 1 inputs the second frequency (class label) set in the frequency setting field 501 to the generation model 50 together with the first image, and generates the second image. The server 1 can superimpose a part of the image region of the generated second image on the first image to generate a synthesis image, and outputs the synthesis image to the diagnostic imaging apparatus 2.

The diagnostic imaging apparatus 2 displays the synthesis image output from the server 1 as a tomographic image 502. In this case, the diagnostic imaging apparatus 2 preferably displays the image region in a display mode different from that of the other image regions such that the image region corresponding to the second image can be distinguished. For example, the diagnostic imaging apparatus 2 displays a display change button 503 in association with the tomographic image 502, and changes a display color of the image region corresponding to the second image when a display change is set to ON by the display change button 503. In addition to the change of the display color, for example, emphasis display of a region boundary indicated by a relatively thick line, and the like may be executed. In this manner, by making it possible to distinguish the image region converted by the server 1, it is possible to more suitably support image diagnosis.

Figure 6:
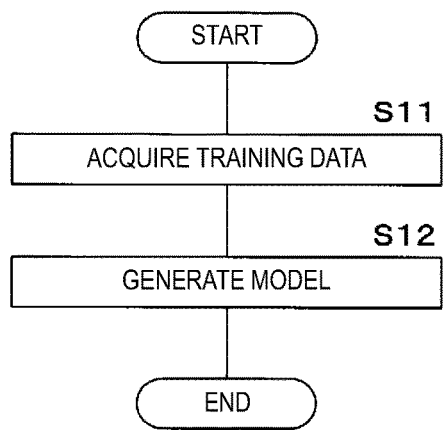
FIG. 6 is a flowchart showing a procedure of a generation process of the generation model.

FIG. 6 is a flowchart showing a procedure of a generation process of the generation model 50. Based on FIG. 6, processing contents when the generation model 50 is generated by machine learning will be described.

The control unit 11 of the server 1 acquires training data including ultrasound tomographic images of a plurality of frequencies (S11). When an ultrasound tomographic image of one frequency is input, the control unit 11 generates the generation model 50 for generating an ultrasound tomographic image of another frequency based on the training data (S12). Specifically, as described above, the control unit 11 generates the StarGAN as the generation model 50. The control unit 11 ends a series of processes.

Figure 7:
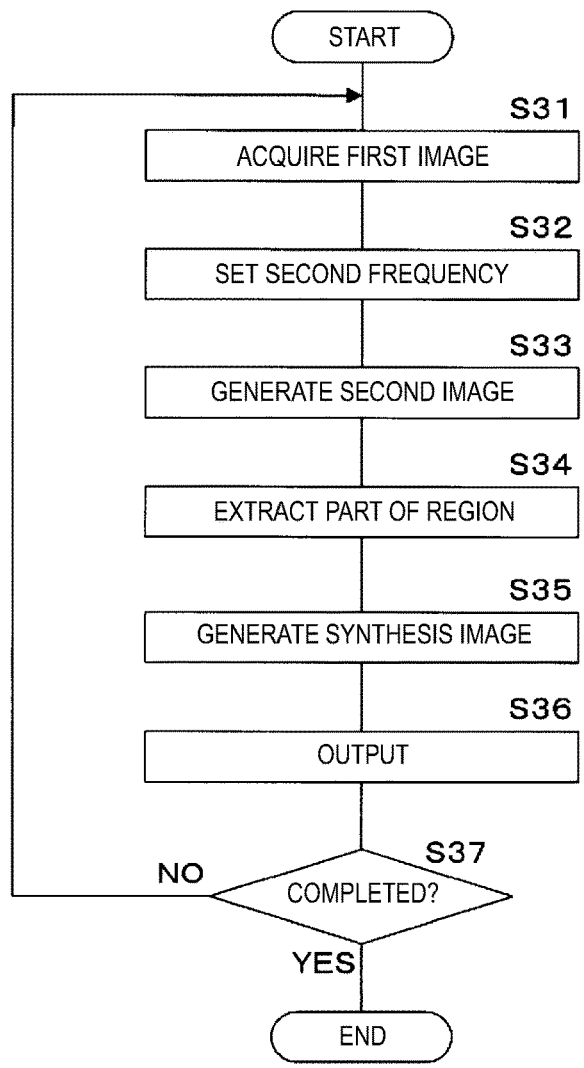
FIG. 7 is a flowchart showing a procedure of a generation process of a second image.

FIG. 7 is a flowchart showing a procedure of a generation process of a second image. Based on FIG. 7, processing contents when the second image is generated will be described.

The control unit 11 of the server 1 starts a series of processes in response to a request from the diagnostic imaging apparatus 2, for example, at a start of an ultrasound inspection. The control unit 11 acquires the first image obtained by imaging the lumen organ of the patient based on the ultrasound signal of the first frequency from the diagnostic imaging apparatus 2 (S31). Specifically, as described above, the control unit 11 acquires an ultrasound tomographic image in the blood vessel of the patient.

The control unit 11 receives a setting change of changing the frequency of the ultrasound signal from the first frequency to the second frequency (S32). When the setting change is received, the control unit 11 starts a process based on the generation model 50, inputs the first image acquired in S11 to the generation model 50, and generates the second image when imaging is executed with the ultrasound signal of the second frequency (S33). Specifically, as described above, the control unit 11 inputs the first image acquired from the diagnostic imaging apparatus 2 and the target second frequency (class label) to the generation model 50, and generates the second image.

The control unit 11 extracts a part of an image region from the generated second image (S34). Specifically, the control unit 11 extracts an image region within a predetermined distance from an image center point at a distance corresponding to the second frequency according to the generated second image. The control unit 11 generates a synthesis image in which the extracted image region is superimposed on the first image (S35). The control unit 11 outputs the generated synthesis image to the diagnostic imaging apparatus 2 (S36).

The control unit 11 determines whether the ultrasound inspection in the diagnostic imaging apparatus 2 is completed (S37). When it is determined that the inspection is not completed (NO in S37), the control unit 11 returns the process to S31. In this case, the control unit 11 repeats the processes of S31 to S36, sequentially acquires the first images from the diagnostic imaging apparatus 2, inputs the first images to the generation model 50, sequentially generates the second images (i.e., a plurality of second images), and outputs the synthesis images. When it is determined that the inspection is completed (YES in S37), the control unit 11 ends the series of processes.

As described above, according to the first embodiment, it is possible to obtain an ultrasound tomographic image of a desired frequency, and it is possible to suitably support the ultrasound inspection.

According to the first embodiment, it is possible to obtain the synthesis image obtained by combining the first image and the second image, and it is possible to achieve both a relatively high resolution and grasping of information in the depth direction.

According to the first embodiment, by changing a display mode of a region of the second image superimposed on the first image, it is possible to clearly indicate a portion processed using the generation model 50.

According to the first embodiment, a second image of any frequency selected by the user can be generated using the generation model 50 that performs the mutual conversion of images of a plurality of frequencies.

Second Embodiment

In the first embodiment, a form is described in which a synthesis image is generated. In the synthesis image, one type of second image is superimposed on the first image. In the present embodiment, a form will be described in which second images corresponding to a plurality of second frequencies are generated and superimposed on the first image.

Figure 8:
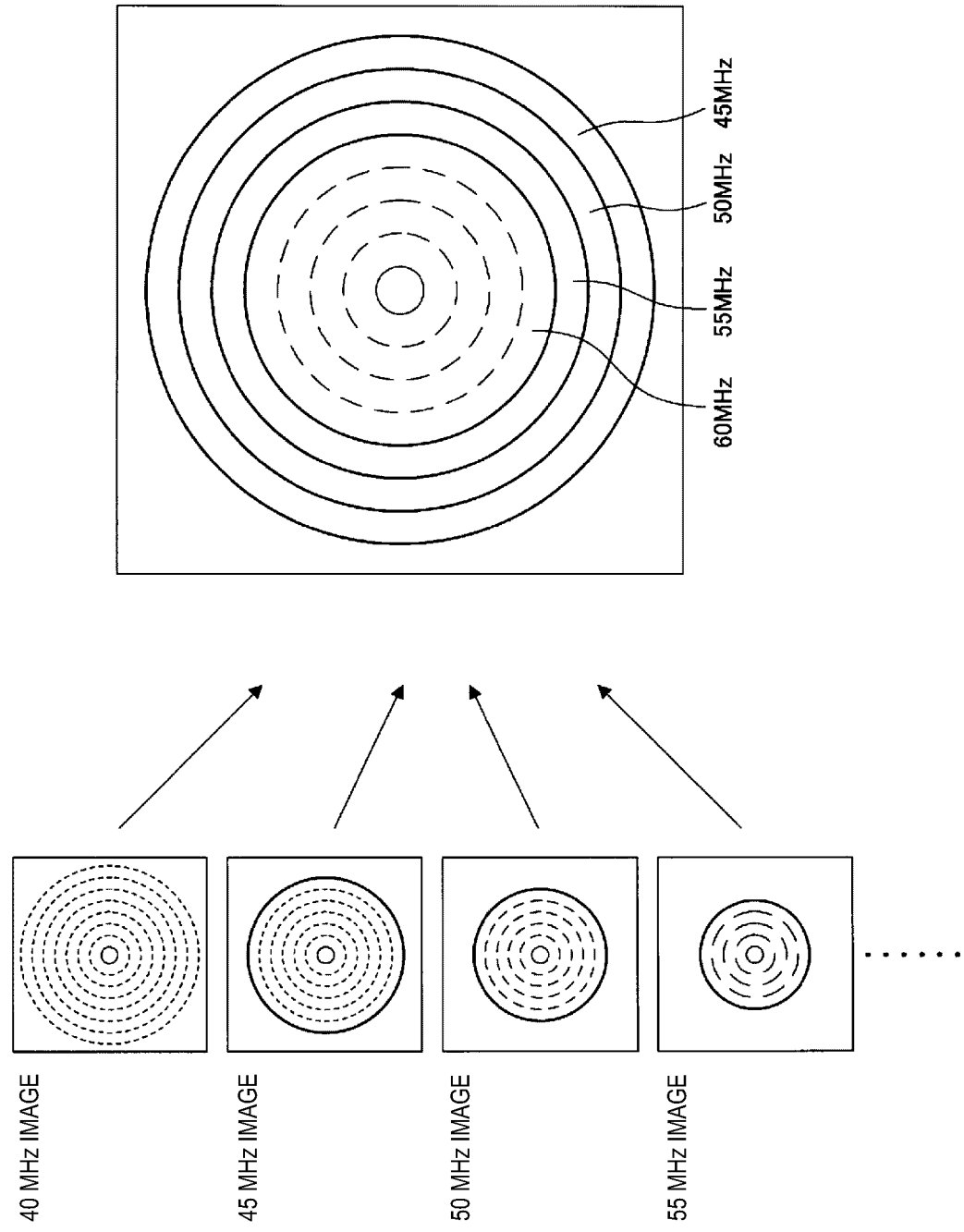
FIG. 8 is an explanatory diagram showing an example of a synthesis image according to a second embodiment.

FIG. 8 is an explanatory diagram showing an example of a synthesis image according to a second embodiment. FIG. 8 conceptually shows a state in which a plurality of second images corresponding to a plurality of second frequencies are superimposed on the first image. An outline of the present embodiment will be described with reference to FIG. 8.

When the first image is acquired from the diagnostic imaging apparatus 2, the server 1 inputs the acquired first image to the generation model 50 and generates a plurality of second images corresponding to a plurality of second frequencies. For example, the server 1 receives a setting input of a plurality of frequencies as the second frequencies from the user, and generates the second images corresponding to the set frequencies. For example, the server 1 may automatically select, as the second frequencies, a plurality of frequencies higher than the first frequency according to the first image from the plurality of frequencies that can be generated by the generation model 50, without receiving the setting input from the user.

The server 1 extracts a part of an image region from each of the plurality of generated second images. Specifically, as in the first embodiment, the server 1 determines a distance from a center point according to a level of the second frequency, and extracts an image region within the distance from the center point. The server 1 determines a distance from the center point based on the second frequency of each of the plurality of second images, and extracts an image region from each of the second images at a different distance such that the distance from the center point decreases as the frequency increases.

The server 1 superimposes the image regions extracted from the second images on the first image to generate a synthesis image. For example, the server 1 determines an arrangement order according to the level of the second frequency such that the image is arranged closer to the back side as the second frequency of the image lowers. The server 1 sequentially superimposes the image regions extracted from the second images of the low frequencies on the first image to generate the synthesis image. By the above-described process, a synthesis image is generated in which the frequencies are continuously converted such that a resolution decreases from the image center toward the outside.

Figure 9:
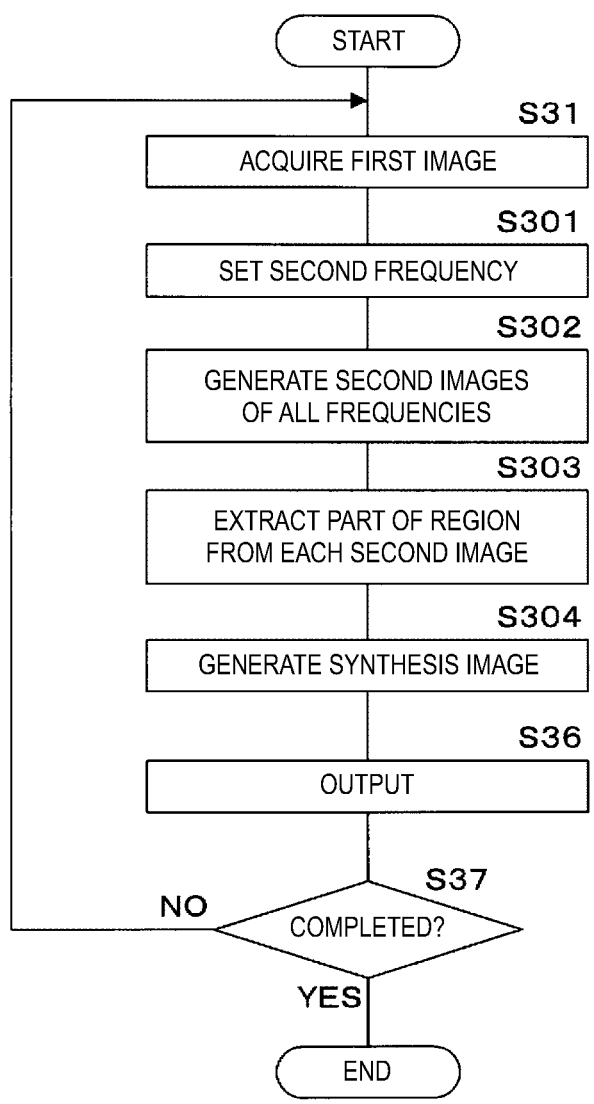
FIG. 9 is a flowchart showing a procedure of a generation process of a second image according to the second embodiment.

FIG. 9 is a flowchart showing a procedure of a generation process of a second image according to the second embodiment. After the first image according to the first frequency is acquired from the diagnostic imaging apparatus 2 (S31), the server 1 executes the following processes.

The control unit 11 of the server 1 receives a setting input for setting a plurality of second frequencies as targets (S301). The control unit 11 inputs the first image to the generation model 50 and generates a plurality of second images corresponding to the plurality of set second frequencies (S302). Specifically, the control unit 11 generates the second images of the plurality of second frequencies higher than the first frequency.

The control unit 11 extracts a part of an image region from each of the plurality of generated second images (S303). Specifically, the control unit 11 sets a distance from the center point based on the second frequencies corresponding to the second images, and extracts an image region from the center point at a different distance.

The control unit 11 superimposes a plurality of image regions extracted from the plurality of second images on the first image to generate a synthesis image (S304). Specifically, the control unit 11 superimposes the image regions extracted from the second images on the first image in an order according to the level of the second frequency such that the image is arranged closer to the back side as the second frequency of the image lowers. The control unit 11 proceeds the process to S36.

As described above, according to the second embodiment, it is possible to obtain a synthesis image in which a resolution is continuously converted from an image center toward the outside.

The detailed description above describes embodiments of a program, an information processing method, an information processing device, and a model generating method. The invention is not limited, however, to the precise embodiments and variations described. Various changes, modifications and equivalents may occur to one skilled in the art without departing from the spirit and scope of the invention as defined in the accompanying claims. It is expressly intended that all such changes, modifications and equivalents which fall within the scope of the claims are embraced by the claims.

What is claimed is:

1. A non-transitory computer-readable medium (CRM) storing computer program code executed by a computer processor that executes a process comprising:
   acquiring a first image obtained by imaging a lumen organ of a patient based on an ultrasound signal of a first frequency;
   generating, with a model, a second image by inputting the acquired first image into the model being learned to generate, when the first image is input, the second image in which the lumen organ is imaged based on an ultrasound signal of a second frequency, and wherein the model is learned using a generative adversarial network;
   generating, using the model, the second image, in which an image region within a predetermined distance from a center point of the first image is converted into the second frequency; and
   generating a synthesis image in which the region within the predetermined distance from the center point is set as the second image and the other region is set as the first image.

2. The computer-readable medium according to claim 1, further comprising:
   generating the second image in which an image region having a different distance from the center point is converted according to the second frequency.

3. The computer-readable medium according to claim 1, further comprising:
  generating the synthesis image in which by superimposing the second image on the first image, and wherein the superimposed image region of the second image is displayed in a display mode different from that of the image region of the first image.

4. The computer-readable medium according to claim 1, wherein the model is a model that is learned to generate, when the first image of one frequency of at least three frequencies is input, the second image of another frequency, further comprising:
  inputting the first image and the second frequency into the model to generate the second image corresponding to the second frequency.

5. The computer-readable medium according to claim 1, further comprising:
  receiving a selection input for selecting the second frequency from a plurality of frequencies; and
  inputting the selected second frequency into the model to generate the second image corresponding to the second frequency.

6. The computer-readable medium according to claim 1, wherein the first images are sequentially acquired during an inspection of the lumen organ, further comprising:
  receiving a setting change of changing the first frequency to the second frequency; and
  when the setting change is received, inputting the sequentially acquired first images into the model, and starting the generation of the second image.

7. An information processing device comprising:
  a computer processor configured to:
    acquire a first image obtained by imaging a lumen organ of a patient based on an ultrasound signal of a first frequency;
    generate a second image by inputting the acquired first image into a model, the model being learned to generate, when the first image is input, the second image in which the lumen organ is imaged based on an ultrasound signal of a second frequency, and wherein the model is learned using a generative adversarial network;
    generate, using the model, the second image, in which an image region within a predetermined distance from a center point of the first image is converted into the second frequency; and
    generate a synthesis image in which the region within the predetermined distance from the center point is set as the second image and the other region is set as the first image.

8. The information processing device according to claim 7, wherein the computer processor is configured to:
  generate the synthesis image by superimposing the second image on the first image.

9. The information processing device according to claim 7, wherein the first image is an ultrasound tomographic image obtained by imaging an inside of a blood vessel of a patient.

10. The information processing device according to claim 7, wherein the computer processor is further configured to:
  generate the second image in which an image region having a different distance from the center point is converted according to the second frequency.

11. A model generating method executed by a computer, the model generating method comprising:
  acquiring training data including a first image and a second image obtained by imaging a lumen organ of a patient based on ultrasound signals of a first frequency and a second frequency, respectively;
  generating, based on the training data, a model that is learned to generate the second image when the first image is input, and wherein the model is learned using a generative adversarial network;
  generating, using the model, the second image, in which an image region within a predetermined distance from a center point of the first image is converted into the second frequency; and
  generating a synthesis image in which the region within the predetermined distance from the center point is set as the second image and the other region is set as the first image.

12. The model generating method according to claim 11, further comprising:
  generating the synthesis image by superimposing the second image on the first image.

13. The model generating method according to claim 12, wherein the first image is an ultrasound tomographic image obtained by imaging an inside of a blood vessel of a patient.

14. The model generating method according to claim 11, further comprising:
  generating the second image in which an image region having a different distance from the center point is converted according to the second frequency.

15. The model generating method according to claim 12, further comprising:
  generating the synthesis image in which the superimposed image region of the second image is displayed in a display mode different from that of the image region of the first image.

16. The model generating method according to claim 11, wherein the model is a model that is learned to generate, when the first image of one frequency of at least three frequencies is input, the second image of another frequency, further comprising:
  inputting the first image and the second frequency into the model to generate the second image corresponding to the second frequency.

17. The model generating method according to claim 11, further comprising:
  receiving a selection input for selecting the second frequency from a plurality of frequencies; and
  inputting the selected second frequency into the model to generate the second image corresponding to the second frequency.

18. The model generating method according to claim 11, wherein the first images are sequentially acquired during an inspection of the lumen organ, further comprising:
  receiving a setting change of changing the first frequency to the second frequency; and
  when the setting change is received, inputting the sequentially acquired first images into the model, and starting the generation of the second image.

19. The computer-readable medium according to claim 1, wherein the predetermined distance is determined based on the second frequency.

20. The computer-readable medium according to claim 19, wherein the predetermined distance decreases as a second frequency increases.

* * * * *